Figure 1:
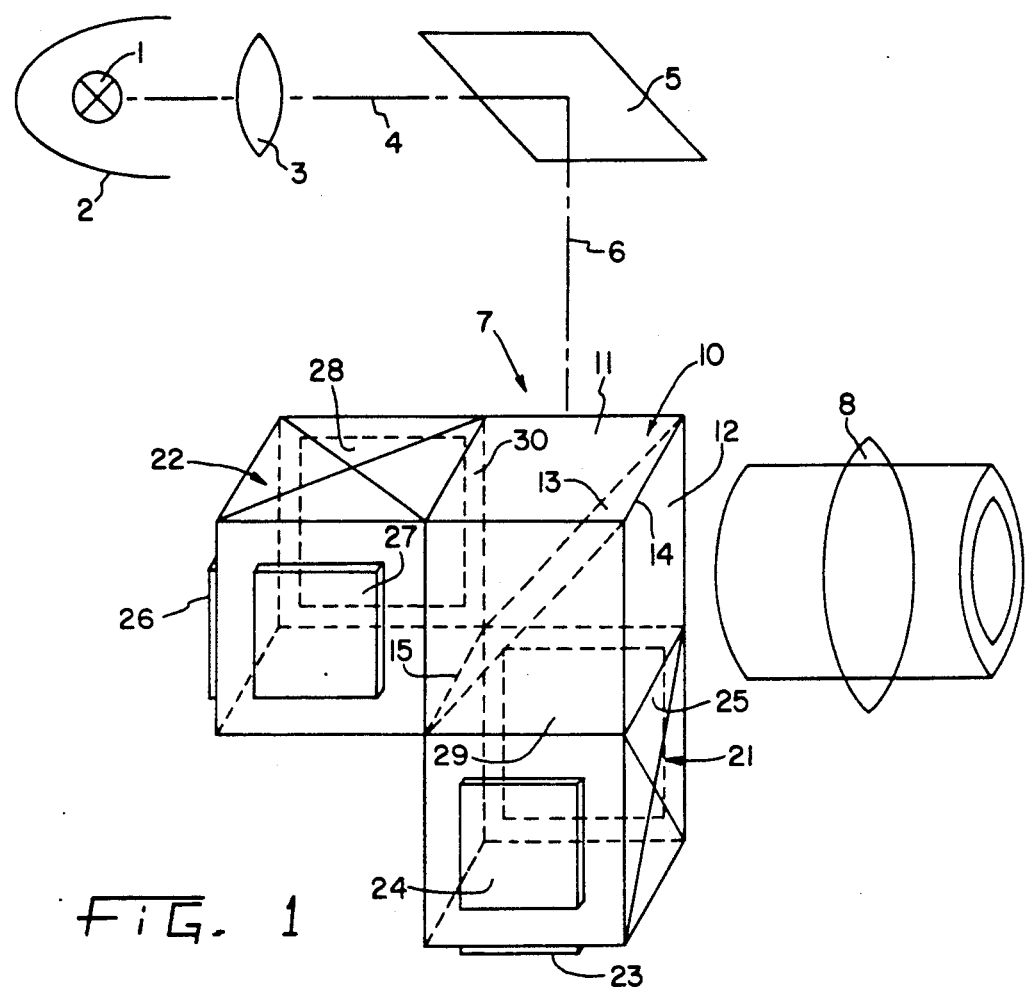

United States Patent [19]

Baur et al.

[11] Patent Number: 5,028,121
[45] Date of Patent: Jul. 2, 1991

[54] PROJECTION DEVICE

[75] Inventors: Günter Baur, Freiburg; Lutz Pickelmann, Munich; Jörg Seibel, Grunern, all of Fed. Rep. of Germany

[73] Assignee: Fraunhofer-Gesellschaft Zur Forderung Der Angewandten Forschung E.V., Munich, Fed. Rep. of Germany

[21] Appl. No.: 439,386

[22] PCT Filed: Jun. 11, 1988

[86] PCT No.: PCT/DE88/00349

§ 371 Date: Nov. 15, 1989

§ 102(e) Date: Nov. 15, 1989

[87] PCT Pub. No.: WO88/10545

PCT Pub. Date: Dec. 29, 1988

[30] Foreign Application Priority Data

Jun. 19, 1987 [DE] Fed. Rep. of Germany ....... 3720375

[51] Int. Cl.$^5$ ...................... G02F 1/133; G03B 21/14; G03B 21/28

[52] U.S. Cl. ................................ 350/331 R; 350/337; 353/31; 353/81; 353/84

[58] Field of Search ............. 350/331 R, 337; 353/20, 353/31, 33, 34, 81, 82, 84, 122

[56] References Cited

U.S. PATENT DOCUMENTS

| | | | |
|---|---|---|---|
| 3,704,934 | 12/1972 | Holmes et al. | 350/152 |
| 4,151,554 | 4/1979 | Tucker | 358/60 |
| 4,425,028 | 1/1984 | Gagnon et al. | 350/331 R |
| 4,544,237 | 10/1985 | Gagnon | 350/331 R |
| 4,687,301 | 8/1987 | Ledebuhr | 350/337 |
| 4,842,374 | 6/1989 | Ledebuhr | 350/331 R |
| 4,909,601 | 3/1990 | Yajima et al. | 350/331 R |
| 4,943,154 | 7/1990 | Miyatake et al. | 353/34 |

FOREIGN PATENT DOCUMENTS 0083090 12/1982 European Pat. Off. .
0083440 12/1982 European Pat. Off. .
3500166 7/1985 Fed. Rep. of Germany .
61-99118 5/1986 Japan .

OTHER PUBLICATIONS

"Practical Methods of Making and Using Multilayer Filters", Mary Banning, Journal of the Optical Society of America, vol. 37, No. 10, Oct. 1947, pp. 792-797.
"LCD Full-Color Video Projector", Shinji Morozume et al., SID 86 Digest, pp. 375-378.

Primary Examiner—Stanley D. Miller
Assistant Examiner—Anita Pellman Gross
Attorney, Agent, or Firm—Jeffers, Hoffman & Niewyk

[57] ABSTRACT

A projector has a light source (1) for producing a parallel beam of white light (4); two dichroic prisms (21, 22) each having two dichroic colour-splitting layers, which on three of their sides have three liquid crystal light valve arrangements (23, 24, 25, 26, 27, 28) associated with different components of the color image; a lens (8) through which the color image components produced by the light valve arrangements (23 to 28) can be projected together on to a screen. The light valve arrangements (23 to 28) associated with the two dichroic prisms operate by reflection. Each of the two dichroic prisms (21, 22) is coupled with one of the outlets of a polarizing beam splitter (10), said outlets being associated with different polarizing directions. The polarizing beam splitter (10) distributes the beam of white light (4, 6) to the two dichroic prisms (21, 22) and directs the light of the activated image points travelling back from the two dichroic prisms into the lens (8).

12 Claims, 4 Drawing Sheets

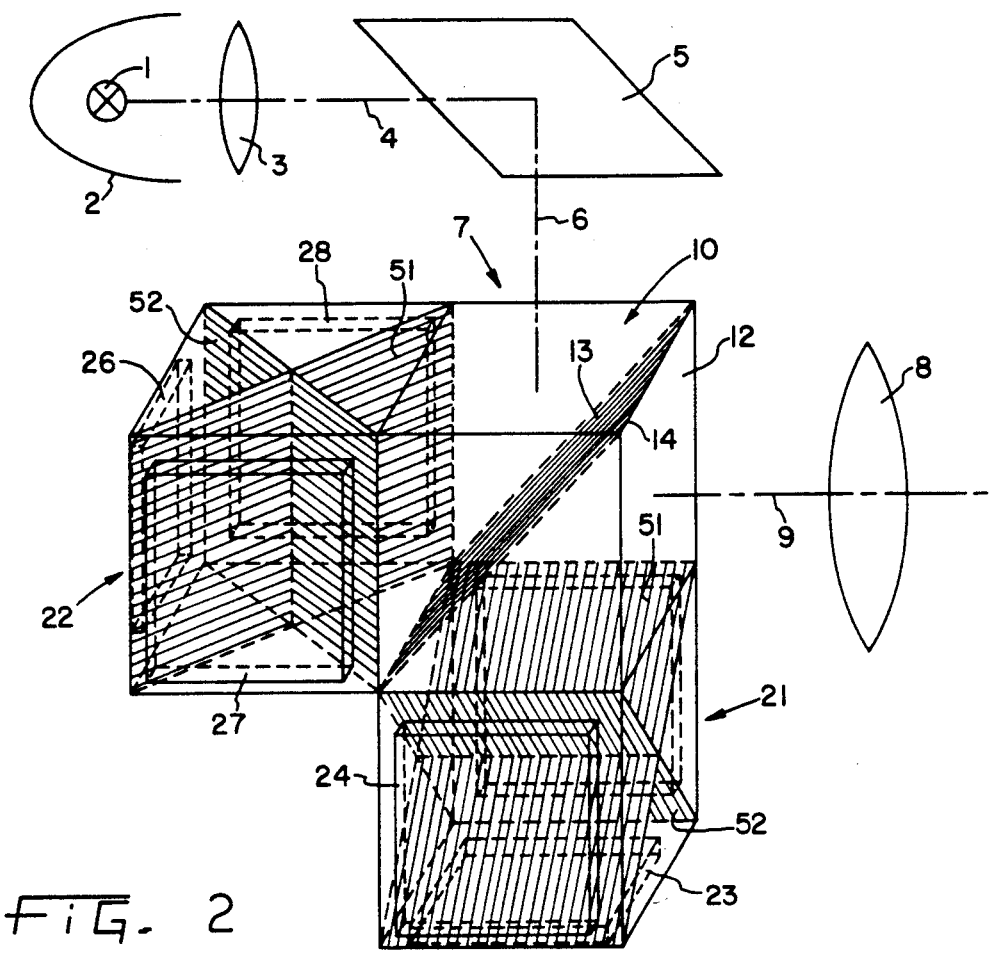
FIG. 2
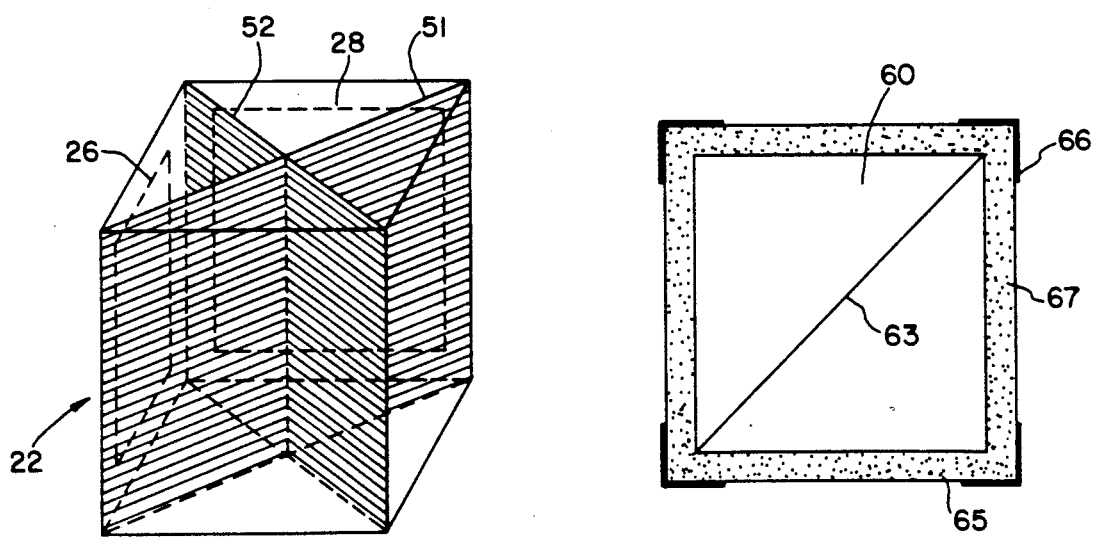
FIG. 7
FIG. 8

PROJECTION DEVICE

The invention relates to a projection device with a light source and an arrangement for generating a white parallel light beam, with at least one dichroic prism which is provided on three of its sides with liquid crystal light valve arrangements allocated to three different color image separations, and with an objective through which the color image separations generated by the light valve arrangements can be projected in common onto a canvas.

Such a projection device for projecting color images without the use of a cathode ray tube is described in S. Morozumi et al., SID 86 DIGEST (1986), pages 375 ff. The liquid crystal light valve arrangements allocated to the color image separations are arranged on three face sides of a dichroic prism, the projection objective being arranged on the fourth face side. The white parallel light beam coming from the light source is deflected with the aid of a mirror arrangement with two dichroic mirrors in such a way that it passes over the light valve arrangements into the interior of the dichroic prism and from there to the projection objective.

Proceeding from this state of the art, underlying the invention is the problem of creating a projection device which makes it possible to achieve a higher light yield and/or image resolution.

This problem is solved according to the invention by the means that two dichroic color divider cubes with reflectively operating light valve arrangements are provided which are coupled in each case with one of the outputs of a polarizing beam divider allocated to the various polarization directions, through which, on the one hand the white light beam is divisible onto the two color divider cubes and through which, on the other hand, the light which returns to the color divider cubes of the activated image points is leadable into the objective.

Expedient formations and further developments of the invention are characterized in the subclaims.

In the following the invention is explained in detail with the aid of the drawing.

Figure 4:
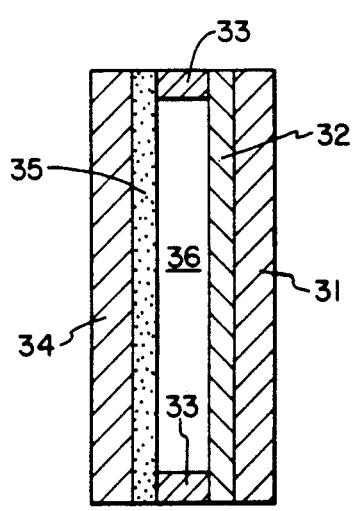
Figure 6:
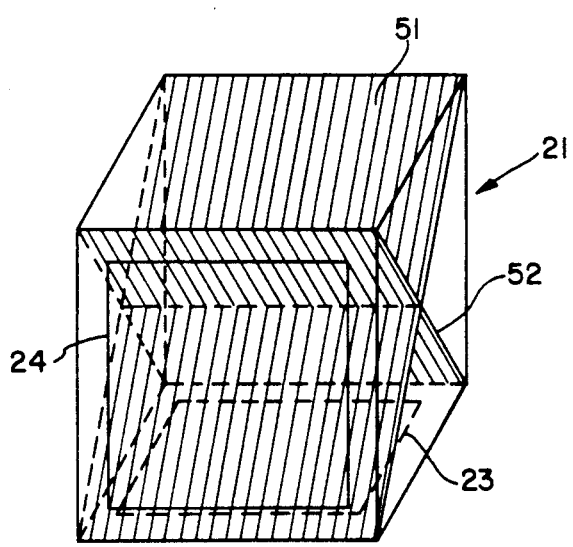
Figure 5:
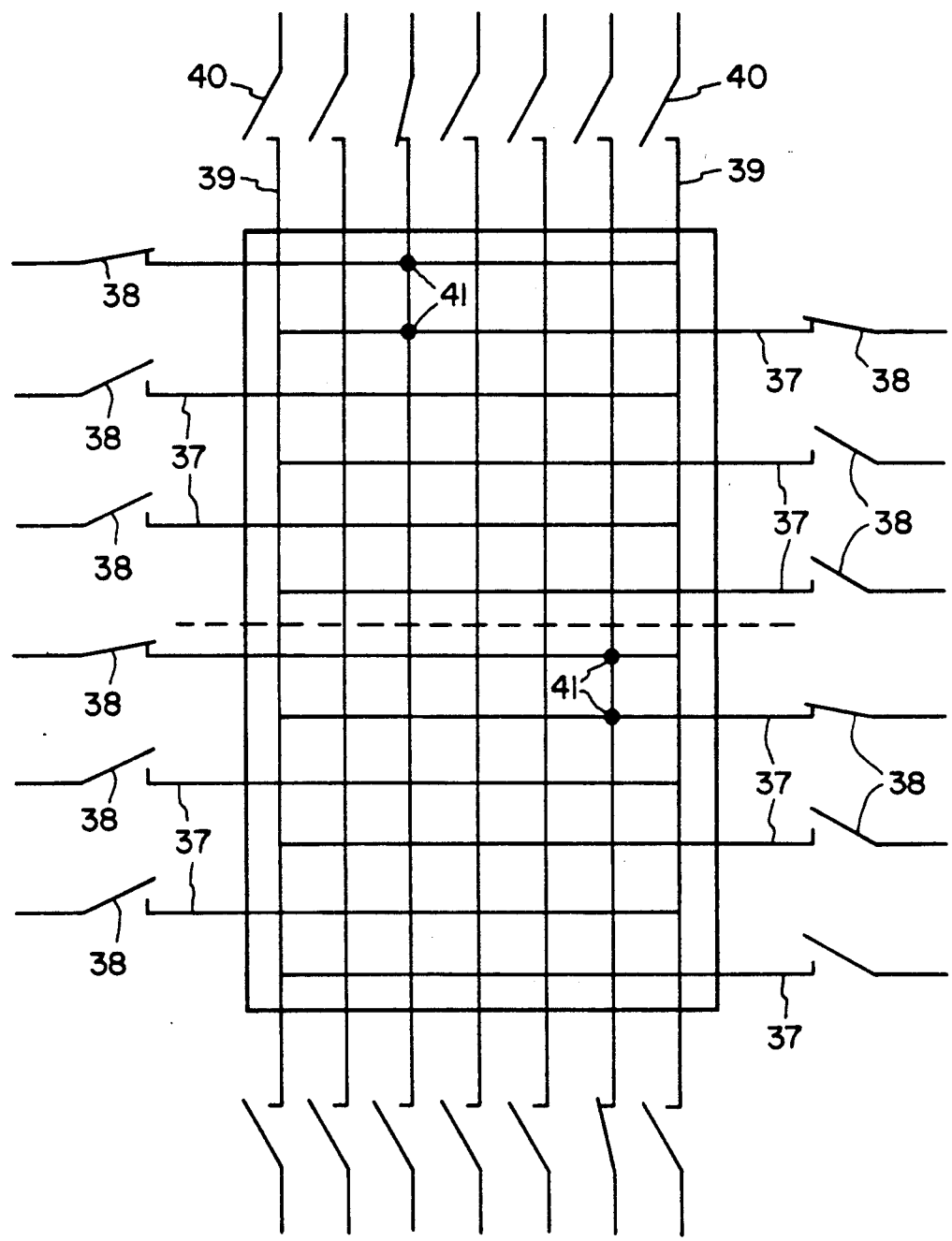
Figure 3:
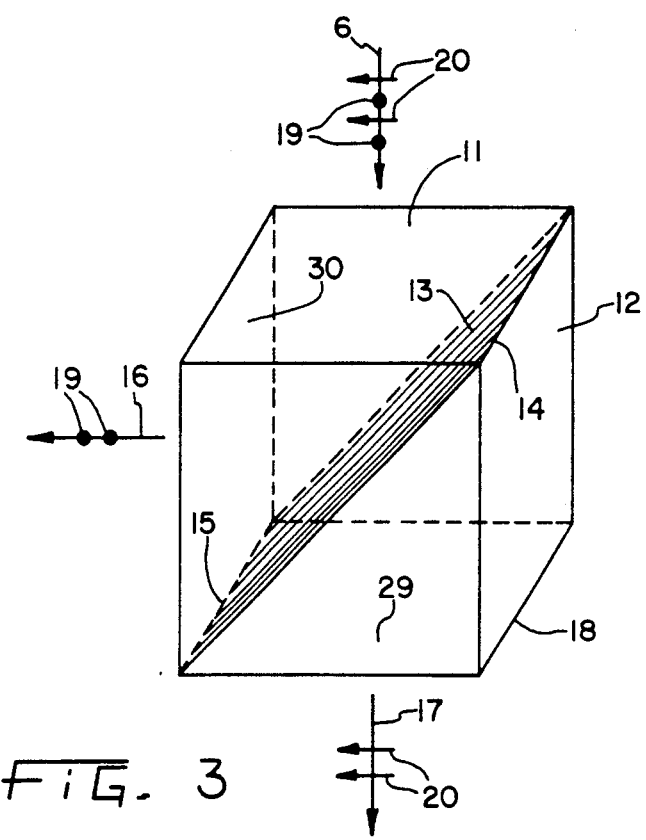

FIG. 1 shows a projection device according to the invention in a schematic perspective view;

FIG. 2 a view corresponding to FIG. 1, in which the dielectric coatings of the various optical components are shaded;

FIG. 3 the beam divider cube of the device of the invention in an enlarged representation to illustrate the various polarization directions;

FIG. 4 a cross section through one of the liquid crystal light valves of the projection device;

FIG. 5 a schematic plan view of a liquid crystal matrix display which is used as light valve;

FIG. 6 the first color divider cube of the projection device, in a perspective view;

FIG. 7 the second color divider cube in a perspective view to illustrate the differing orientations of the dichroic color divider layers;

FIG. 8 a second form of execution of the beam divider cube and

Figure 9:
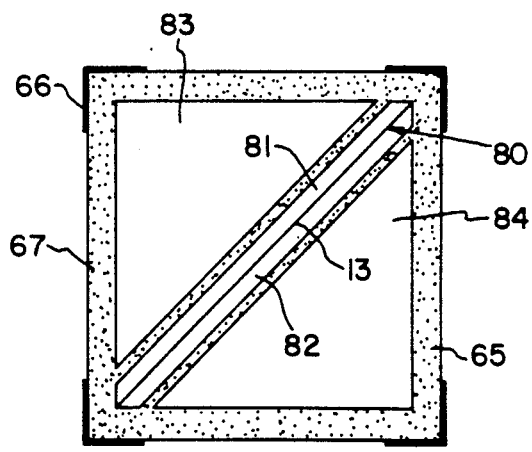

FIG. 9 a third form of execution of the beam divider cube.

The electro-optical projection device represented in FIG. 1 has a light source 1 delivering white light, to which there are allocated a reflector 2 and collimator lens 3 in order to generate a white parallel light beam bundle, which is schematically illustrated in FIG. 1 by its center line 4. The light beam 4 is deflected with the aid of a deflecting mirror 5. The deflected light beam 6 acts upon a light valve unit 7. In the light valve unit 7, in correspondence to the images to be projected, the white light beam bundle 6 is influenced in the manner discussed further below in its color distribution and intensity distribution in such a way that with the aid of an objective 8 a projection image is formed on a canvas (not represented in the drawing). The central axis of the light leaving the light valve unit 7 is provided in FIG. 2 with the reference number 9.

The light valve unit 7 contains a polarizing beam divider cube 10, the upper side 11 of which serves as light inlet for the light beam 6 and the side 12 of which, facing to the right in FIGS. 1, 2 and 3, serves as light outlet. The beam divider cube 10 is a MacNeille prism, the vaporized-on polarizing beam divider layer 13, proceeding from the edge 14 formed by the upper side 11 and the side 12, extends diagonally in the manner represented in FIGS. 1, 2 and 3 through the beam divider cube 10 to the edge 15 lying diagonally opposite the edge 14.

The polarizing beam divider cube 10, which is represented separately in FIG. 3, consists of a highly refractive glass and divides the incident unpolarized light beam 6 into two light bundles of opposite direction of polarization, which is schematically represented in FIG. 3. The unpolarized light beam 6 passes over the upper side 11 into the beam divider cube 10, in which process on the beam divider layer 13 a part of the light is reflected as s-wave 16 with a polarization direction at a right angle to the plane of incident while another light constituent as a p-wave leaves the beam divider cube 10 on the underside 18 lying opposite the upper side 11. The polarization directions of the light beam bundle 6, of the s-wave 16 and of the p-wave 17 are symbolized in FIG. 3 in each case by points 19 or by arrows 20.

As is evident in FIGS. 1 and 2, to the beam divider cube 10 there are allocated a first color divider cube 21 and a second color divider cube 22, in which the light of the p-wave 17 and of the s-wave 16 is resolved into colors, and on reflective liquid crystal light valves 23, 24, 25, 26, 27 and 28 which are arranged on different face surfaces of the color divider cubes 21 22, is reflected according to the particular local degree of reflection of the liquid crystal light valves. The light reflected from the liquid crystal light valves 23 to 28 is altered in its polarization state, as is yielded from the following description, in correspondence to the individual image points of the image to be projected, so that the light of activated image points fed from the first color divider cube 21 into the underside 29 of the beam divider cube 10 is deflected on the beam divider layer 13 in the direction of the objective, while the light of active image points fed into the side 30 facing away from the objective 8 of the beam divider 10 is let through from the beam divider layer 13 to the objective 8. The light of the unactivated image points not altered in respect to its polarization sight by the liquid crystal light valves, passes in each case on the same path on which it is propagated from the first color divider cube 21 and to the second color divider cube 22, respectively, back to the upper side 11 of the beam divider cube 10 and from there back into the illuminating system of the projection device.

The construction of the reflective light crystal light valves 23 to 28 is yielded from FIGS. 4 and 5.

FIG. 4 shows in cross section and represents, much exaggerated in respect to thickness, by way of example the structure of the liquid crystal light valve 26, the front glass plate 31 of which, which is coupled with the color divider cube 2, carries on its back side a transparent front electrode 32. With the aid of spacers 33 and a rear glass plate 34 which is coated with a mirror 35 active as back electrode, a reception space 36 is bounded for a liquid crystal. Obviously the back electrode and the mirror can also be realized by separate coatings.

The transparent front electrode 32 and the back electrode 35 are structured in the manner schematically represented in FIG. 5 corresponding to a liquid crystal matrix display unit. As one perceives in FIG. 5 for the drive of the image lines there are provided a large number of line electrodes 37 with line switches 38 and for the drive of the image columns there are a large number of column electrodes 39 with column switches 40. In the position represented in FIG. 5 of the line switches 38 and column switches 40 the image points or places of the light valve matrix marked with 41 are active, so that the image points allocated to the points 41 on the projection screen are altered in their brightness and/or color electro-optically with respect to the other, undriven image points.

When it is possible to dispense with a colored image projection, the color divider cubes 21 and 22 can consist of simple glass cubes which present on the sides lying opposite the sides 30 and 29 exclusively the liquid crystal light valves 23 and 26. In a simplified form of execution (not shown in the drawing) the light reflected on the beam divider layer 13 passes to the liquid crystal light valve 26, which brings about on the activated light points, corresponding to the degree of the particular drive, a turning of the polarization direction and reflects the light modulated in respect to its polarization direction to the beam divider cube 10, where the light modified in its polarization direction with respect to the s-polarization is propagated in the direction of the objective 8.

Correspondingly, in the simplified form of execution not represented in the drawing the light of the p-wave 17 passes over the underside 29 into a glass cube corresponding to the first color divider cube 21, which glass cube is provided only with the liquid crystal light valve on the side lying opposite the underside 29. The light of the p-wave is changed in correspondence to the drive of the matrix points in its polarization direction with respect to the p-polarization, so that the light corresponding to the activated image points is not let through on the beam divider layer 13, but is reflected in the direction of the objective 8. In such an arrangement with two liquid crystal light valves 23, 26 the arrangement of the image lines can be chosen, on the one hand, so that the image lines of the two liquid crystal light valves 23, 26 overlap, so that there is yielded a contrast improvement or increase in intensity. On the other hand, it is possible to shift the image lines with respect to one another in such a way that the image line of the one matrix comes to lie in the empty line of the other matrix, in which process the line number of the projected total image is doubled with respect to the driven line number in the two liquid crystal light valves 23, 26. In this manner, with light valves that deliver a resolution of, for example, 512 image lines there can be reached in the projected image a resolution of 1024 image lines, in which the total image also, for example in its upper half, is set up with the light valves 23 to 25 of the first color divider cube 21 and in its lower half with the light valves 26 to 28 of the second color divider cube 22.

With the projection device represented in FIGS. 1 and 2 it is possible to superpose six color separations in order in this manner to obtain color projection images. For this reason the color divider cubes 21, 22 have in each case three liquid crystal light valves 23, 24, 25 and 26, 27, 28, respectively.

As one perceives in FIGS. 1, 2 and 6, the first color divider cube 21 has a first dichroic color divider layer 51 as well as a second dichroic color divider layer 52. The dichroic color divider 51 consists of a vaporized-on dielectric layer which reflects the blue spectral constituent with a wavelength of less than 490 nm for the p-wave and 510 nm for the s-wave in the direction of the liquid crystal light valve 24. The orientation of the plane of the dichroic color divider layer 51 runs from the upper rear edge to the front lower edge of the first color divider cube 21.

For the red spectral constituent with a wavelength of more than 570 nm for the p-wave and 600 nm for the s-wave there is provided the second dichroic color divider layer 52 which, as is yielded from FIGS. 1, 2 and 6, extends from the upper front edge to the rear lower edge of the first color divider cube 21. Accordingly, the liquid crystal light valve 24 is allocated to the blue separation, the liquid crystal light valve 25 to the red separation and the liquid crystal light valve 23 to the green separation.

The construction of the second color divider cube 22 corresponds to that of the first color divider cube 21, in which, however, the orientation of the section line of the dichroic color divider layers 51, 52 in the second color divider cube 22 in the drawing runs in vertical direction and not in horizontal direction as in the case of the first color divider cube 21. The second color divider cube 22, therefore, is turned with respect to the first color divider cube 21 through 90° about the edge 15. The dichroic color divider layers 51, 52 are provided, for clarification, with hatching lines in FIGS. 2, 6 and 7, whereas the hatching lines were omitted in FIG. 1 in order to make the liquid crystal light valves 23 to 28 more easily recognizable. The glass substrate of the color divider cubes 21, 22 forms there in each case the supporting surfaces for the color divider layers 51, 52 as well as the liquid crystal light valves 23 to 28.

The functioning of the second color divider cube 22 corresponds to that of the first color divider cube 21, and the worker in the field perceives that the liquid crystal light valve 27 is allocated to the blue separation the liquid crystal light valve 28 to the red separation and the liquid crystal light valve 26 to the green separation.

Since with the liquid crystal light valves 23 to 28 the polarization state of the incident light is changed, there result after the reflection for the recombination of the light somewhat shifted transmission curves of the color divider mirrors for the p-wave and s-wave.

Undesired spectral constituents which by reason of this edge shifting of the transmission curve do not pass into the projection, are reflected back through reflective dichroic color fibers in front of the light valves into the illumination system, since their polarization state was not changed. The angle of incidence for dichroic color filter vaporized onto the correspondening cube outsides amounts to 0 degrees.

Before the liquid crystal light valves 23, 24, 26 and 28 there are interposed dichroic color filters, while for the liquid crystal light valves 25 and 27 no interposed filters are required.

The color filter allocated to the liquid crystal light valve 26 reflects light whose wavelength is less than 515 nm, while the color filter allocated to the liquid crystal light valve 28 reflects light with a wavelength of less than 600 nm.

To the liquid crystal light valve 24 of the first color divider cube 21 there is allocated a dichroic color filter which reflects light with a wavelength of more than 490 nm. The filter allocated to the liquid crystal light valve 23 reflects light with a wavelength of more than 570 nm.

By reason of the color dividers and color filter layers discussed above, spectral constituents are projected whose blue light lies in the range between 400 and 490 nm, whose green light lies in the range between 515 and 570 nm and whose red light lies in the range between 600 and 700 nm.

As is yielded from the preceding, the polarizing beam divider cube 10 acts simultaneously as polarizer and analyzer. It has, furthermore, the function of superposing the partial images of the individual light valves 23 to 28. The image arising on the canvas (not represented in the drawing) is composed of the overlapping of six color separations. The image separations are conceived in such a way that in the superposing of image points of the same color but different polarization direction there can be achieved an increase in intensity and virtually a doubling of the gray stages possible with individual light valves. In an arrangement in which the image lines of the one light valve fall into an empty line of the other light valve, the number of lines of the total image can be doubled with electronic measures.

FIGS. 8 and 9 show special forms of execution for the replacement of the beam divider cube 10, FIG. 8 showing a beam divider cube 60 in the liquid bath and FIG. 9 showing a polarizing beam divider 80 in the liquid bath.

A high image contrast can be achieved with a polarizing beam divider 10 of highly refractive materials with an index of refraction of about 1.62. The tension double refraction induced by temperature gradients can be eliminated by the use of polarizing plates in liquid cuvettes. Since no highly refractive liquids with a refractive index of about 1.6 with sufficient transparency in wavelengths between 400 nm and 500 nm are available, according to one execution of the invention there is proposed the beam divider represented in FIG. 8, which as key component makes possible the realization of the projection system according to the invention, especially for high light streams.

The beam divider represented in FIG. 8 consists of a polarizing beam divider cube 60 of highly refractive glass with a vaporized-on layer sequence on the diagonal surface. The vaporized-on polarizing beam divider layer is provided in FIG. 8 with the reference number 63. The beam divider cube 60 consisting of highly refractive glass is immersed in a liquid bath 65. In order to avoid differences in index of refraction, the glass substrate (untreated outsides) and the liquid are attuned to one another with respect to the dispersion.

The narrow liquid layer of the liquid bath 65 which surrounds the beam divider cube 60 brings it about that a uniform temperature distribution can be maintained and, accordingly, an individual tension double refraction is reduced. The liquid bath 65 is present in a cuvette 66 in which several cuvette windows 67 are provided.

By reason of the short light path through the thin liquid layer between the cuvette wall and the beam divider cube 60, there are yielded only slight absorptions in the spectral range between 400 and 500 nm.

The liquid reservoir of the liquid bath 65 is connected with a buffer vessel (not shown in the drawing), in order to avoid a pressure rise on rise of the temperature. The windows 67 of the cuvette 66 are adapted in respect to the index of refraction (outside wideband-dereflected).

In the replacement represented in FIG. 9 for the beam divider cube 10 the volume of a compact glass body in which through temperature differences there can occur an induced tension double refraction was reduced by splitting open the glass substrate. The polarizing beam divider layer 13 is located in the modification represented in FIG. 9 between two cemented plane-parallel plates 81, 82 of a highly refractive glass substrate. The plane-parallel plates 81, 82 stand like the beam divider layer 13 at an angle of 45 degrees to the incident light beam bundle 6. By two wedge prisms 83, 84 on both sides of the plane-parallel plates 81, 82 there is again achieved the outer form of a cube.

The arrangement described of the prisms 83, 84 and the plane-parallel plates 81, 82 is present in a cube-shaped cuvette 66. Between the plane-parallel plates 81, 82 and the wedge prisms 83, 84 as well as between the prisms 83, 84 and the cuvette windows 67 there are present in each case narrow gap regions that are filled with the highly refractive liquid of the liquid bath 65. All the components of the arrangement represented in FIG. 9 are attuned to one another with respect to the index of refraction and are washed about by a thin liquid layer.

By the extended liquid bath there is again assured a homogeneous temperature distribution, so that a tension double refraction within the arrangement is avoided. By the use of the wedge prisms 83, 84 there is obtained only a short light path through the highly refractive liquid, which results in only slight absorption losses in the wavelength range between 400 and 500 nm. In order to reduce the volumes of the compact glass bodies, the wedge prisms 83, 84 are subdivided and traversed by another liquid gap.

The above-described projection device makes possible the large-image representation in color and is distinguished by a high resolution and high efficiency with simultaneously compact construction. Both polarization directions of the projection light are utilized. Thereby with one and the same hardware construction either the light intensity can be doubled with simultaneous enlargement of the gray-stage scope, or a doubling of the image line number is possible, in which case the different polarization direction of different successive lines is also suited for the three-dimensional representation of images. The choice of the particular type of operation occurs solely by corresponding drive of image lines allocated to the image originals to be reproduced. In connection with the example of execution represented in the drawing there is described an arrangement with LC matrix displays as image original. The image lines are subdivided into four groups, which are driven, for example, in the interlace process. The image information to be represented is input over the image columns. If the projection device is used to increase the light intensity, then in each case two successive image lines are driven simultaneously, so that one and the same image information is represented by two pixels (Pixel). The increase of the light intensity is achieved by the superposing of the images of two identical image originals. Therewith there is simultaneously extended also the gray-stage scope of the projected image. An increase of the line number can be achieved if only every other line of a matrix is driven as image line. The superposing of two partial images of identical color occurs then in the interlace process. Thereby there is achieved a doubling of the maximally drivable number of lines. Since the light of successive lines in the projected image is differently polarized, the process is suited also for the three-dimensional representation of images if the viewer wears a pair of glasses the lenses of which are constructed as differing analyzers.

We claim:

1. A projection device comprising:
   light generating means for generating a white parallel light beam bundle;
   a polarizing beam divider having at least two outputs allocated to different polarization directions;
   at least two dichroic prisms respectively coupled to said outputs, each said dichroic prism including two dichroic color divider layers and three reflectively operating liquid crystal light valve arrangements allocated to three different color image separations, each said light valve arrangement having a matrix of driven image lines for forming a plurality of activatable image points for selectively reflecting color image separated light; and
   an objective through which the reflected color image separated light from the activated image point is projected.

2. Device according to claim 1, wherein said beam divider is a McNeille prism.

3. Device according to claim 2, characterized in that the beam divider is housed in a cuvette filled with a highly refractive liquid.

4. Device according to claim 1, wherein said light valve arrangements have a reflecting layer on the side facing away from the dichroic prisms.

5. Device according to claim 1, wherein color filters are provided between said light valve arrangements and said dichroic prisms.

6. Device according to claim 1, wherein said two dichroic prisms are tilted to one another by 90 degrees and are coupled with sides of said beam divider oriented to one another by 90 degrees.

7. Device according to claim 1, wherein said beam divider is housed in a cuvette filled with a highly refractive liquid.

8. Device according to claim 1, wherein said beam divider includes a beam divider plate which extends along a diagonal in a cuvette that is filled with a highly refractive liquid and in which on both sides of the beam divider plate there are provided highly refractive wedge prisms.

9. Device according to claim 1, wherein said projections of the image lines of all six light valve arrangements cover one another.

10. Device according to claim 1, wherein the projections of the driven image lines of the light valve arrangement of a first said dichroic prism lie between the projections of the image lines of the light valves allocated to a second said dichroic prism.

11. Device according to claim 10, wherein the light valves allocated to said first dichroic prism and the light valves allocated to said second dichroic prism present a second partial image of a three-dimensional image with driven lines of different polarization direction.

12. Device according to claim 1, wherein the projections of the driven image lines of the light valves of a first said dichroic prism lie on the projections of the image lines of the light valves of a second said dichroic prism.

* * * * *